(12) United States Patent
Bricout et al.

(10) Patent No.: US 9,394,422 B2
(45) Date of Patent: *Jul. 19, 2016

(54) COMPOSITION FILLED WITH POLYOLEFIN AND ACTINIDE POWDER

(71) Applicant: COMMISSARIAT A L'ENERGIE ATOMIQUE ET AUX ENERGIES ALTERNATIVES, Paris (FR)

(72) Inventors: Julien Bricout, Marseille (FR); Meryl Brothier, Aix-en-Provence (FR); Pierre Matheron, Manosque (FR); Carine Ablitzer, Saint-Julien-le-Montagnier (FR); Jean-Claude Gelin, Tilleroyes (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/399,958

(22) PCT Filed: May 7, 2013

(86) PCT No.: PCT/EP2013/059438
§ 371 (c)(1),
(2) Date: Nov. 9, 2014

(87) PCT Pub. No.: WO2013/167563
PCT Pub. Date: Nov. 14, 2013

(65) Prior Publication Data
US 2015/0126660 A1    May 7, 2015

(30) Foreign Application Priority Data

May 11, 2012 (FR) .................................. 12 54327

(51) Int. Cl.
| | |
|---|---|
| *C08K 3/22* | (2006.01) |
| *G21C 3/42* | (2006.01) |
| *C08L 91/08* | (2006.01) |
| *G21C 3/58* | (2006.01) |
| *C08K 5/01* | (2006.01) |
| *C08K 5/09* | (2006.01) |

(52) U.S. Cl.
CPC ... *C08K 3/22* (2013.01); *C08K 5/01* (2013.01); *C08K 5/09* (2013.01); *C08L 91/08* (2013.01); *G21C 3/42* (2013.01); *G21C 3/58* (2013.01); *Y02E 30/38* (2013.01)

(58) Field of Classification Search
CPC ............... C08K 3/22; C08K 5/01; C08K 5/09
USPC ............ 252/625–644; 524/430, 439; 523/375
See application file for complete search history.

(56) References Cited

U.S. PATENT DOCUMENTS

| | | | |
|---|---|---|---|
| 4,056,584 A | 11/1977 | Miertschin et al. | |
| 2007/0053785 A1* | 3/2007 | Hetz ..................... | E21B 43/117 419/42 |

FOREIGN PATENT DOCUMENTS

| | | |
|---|---|---|
| EP | 1757896 A1 | 2/2007 |
| FR | 2286476 A1 | 4/1976 |
| GB | 881883 A1 | 11/1961 |
| JP | 2000328103 A | 11/2000 |

OTHER PUBLICATIONS

Copending U.S. Appl. No. 14/399,959, filed Nov. 9, 2014.*
Stuart H. Taylor, et al., "The Activity of Mechanism of Uranium Oxide Catalysts for the Oxidative Destruction of Volatile Organic Compounds", Catalysis Today, 2000, pp. 249-259, Elsevier Science B.V.
Stuart H. Taylor, et al., "A Study of Uranium Oxide Based Catalysts for the Oxidative Destruction of Short Chain Alkanes", Applied Catalysis B: Environmental, 2000, pp. 137-149, vol. 25, Elsevier Science B.V.

* cited by examiner

*Primary Examiner* — Edward Cain
(74) *Attorney, Agent, or Firm* — Baker & Hostetler LLP

(57) ABSTRACT

A composition filled with actinide powder, comprising an organic matrix and an actinide powder or a mixture of actinide powders, comprises at least: a plasticizer comprising an alkane whose longest radical chain comprises at least a few tens of carbon atoms and is in a volume content of between 20% and 70% of the total volume of the organic compounds alone; a binder comprising at least one polyolefinic polymer and which is in a volume content of between 20% and 50% of the total volume of the organic compounds alone; a dispersant comprising a carboxylic acid or salts thereof, the volume content of which is less than 10% of the total volume of the organic compounds alone; said actinide powder or said mixture of actinide powders represent between 40% and 65% of the volume of the filled matrix.

13 Claims, 11 Drawing Sheets

COMPOSITION FILLED WITH POLYOLEFIN AND ACTINIDE POWDER

CROSS-REFERENCE TO RELATED APPLICATIONS

This application is a National Stage of International patent application PCT/EP2013/059438, filed on May 7, 2013, which claims priority to foreign French patent application No. FR 1254327, filed on May 11, 2012, the disclosures of which are incorporated by reference in their entirety.

FIELD OF THE INVENTION

The field of the invention is that of compositions based on actinide powder, and which have the advantage of being injectable since they allow a rheology that is compatible with injection systems. One of the main fields of application may concern (but not exclusively) the manufacture of nuclear fuels (or more generally of actinide-based components/materials).

More generally, the present invention relates to the production of components with more or less complex shapes containing actinides, whether in metallic, oxide, carbide or even nitride form. The standard and industrial production of fuel currently and mainly proceeds via exploitation of powder metallurgy (based on the pressing of the constituent powders of components/fuels to be formed and the sintering of the compacts obtained after pressing).

However, the use of powder metallurgy induces a certain number of drawbacks and obstacles when it is desired to make components of complex shapes or when it is desired to have very good control of the size of the components (and all the more so when these components are of complex shapes) to be produced, without the need for a rectification step.

BACKGROUND

Currently, the manufacture of nuclear fuels (actinide compounds) is typically performed via standard processes based on the metallurgy of powders. Two major steps are exploited to do so:
- the forming of the constituent powders of the fuel (pressing with a potential prior preparation of the powders);
- the sintering of the compact obtained after the powder pressing step.

This type of process is proven and industrial, but induces at least four types of drawbacks:
- the difficulty in controlling the shape of the components obtained from the sintering, which is itself conditioned by the control of the granular stack in the pressing molds (linked to the homogeneity of distribution of the material). Now, since actinide powders are, for some of them, relatively cohesive, this control is not trivial and usually requires preparation of the powders prior to their forming. For certain uses, the geometrical specifications impose rectification of the combustible objects obtained by metallurgy of the powders;
- this preparation of the powders often induces powder dissemination, which leads to an increase in retention in the confinement chambers of the manufacturing process. The result of this is an increased radiological risk;
- the impossibility of obtaining components/fuels whose shape is complex (i.e. any shape) and/or not axisymmetric since the forming is performed industrially by uniaxial pressing;
- the need to render the confinement chambers containing the actinide powders inert so as to limit the risks of pyrophoricity (when the actinides are in metallic or carbide form notably).

To act on all of these drawbacks, the Applicant proposes filled compositions that make it possible to use a process known as powder injection molding (PIM).

However, in order for this type of process to be operative for the use of actinide powders, it is necessary to have available an organic matrix consisting of organic components, generally based on polymers that allow good (in the sense of homogeneous distribution) incorporation of the powder into said organic matrix. This organic matrix must satisfy all of the objective functions and constraints imposed by this type of process in the light of the specificities of the nuclear materials to be used and of the specifications of the targeted fuels.

At the present time, no formulation of organic matrix for preparing actinide components is mentioned in the technical and scientific literature. This may notably be explained by the number of constraints/criteria weighing on a filled organic matrix. These are to be taken into account for the use of actinide powders which have specific properties, and under satisfactory conditions (i.e. conditions making it possible to obtain components whose characteristics are at least equivalent to those obtained by powder metallurgy).

Thus, to satisfy this general problem of manufacturing actinide fuels/components via the PIM process in a satisfactory manner, it is necessary for the envisioned filled matrix to concomitantly satisfy the following criteria:
- an actinide powder filler content in the filled matrix that is sufficient to obtain after debinding granular stack densities of greater than 40%. (It is recalled that the debinding operation makes it possible to remove the constituent carbon-based compounds of the composite filler. This debinding may be performed conventionally via thermal action to volatilize the filler.)

Specifically, when the PIM process is applied to actinide powders whose purpose is to result in objects whose characteristics are similar to those obtained by powder metallurgy, it is necessary after the step of debinding of the formed polymers to result in granular stacks that need to be cohesive, i.e. to keep their shape, and whose density is equivalent to that obtained by uniaxial powder pressing (powder metallurgy). A powder may be considered as cohesive if it notably satisfies the definition of Geldard (class C) or has a Hausner coefficient of greater than 1.4, "Techniques de l'ingenieur mise en forme des poudres, J 3 380-1". To achieve this minimum filler content value, it is necessary for the powder, especially if it is cohesive, as is conventionally the case for actinide powders (and notably the oxides thereof), to be deagglomerated during the blending/preparation of the filler. This prerequisite is not trivial per se for the following reasons:
- the injectability of the filler: despite the filler content criterion mentioned above, it is necessary to be able to use the filled matrix in a mold (or through a die if extrusion is performed), which imposes a shear viscosity range of between 50 and 10 000 Pa·s during injection with a preferential range of less than 1000 Pa·s for a rate gradient of 100 s$^{-1}$;
- the shear-thinning behavior and robustness of the rheological behavior with temperature, or more generally the blending conditions. The rheological behavior of the filler may prove to be prohibitive. Moreover, since actinide powders can be relatively dense, cohesive and polymodal, it is notably necessary to limit any risk of segregation/sedimentation in the filled matrix in the event of poor formulation or mixing condition during the blending;

the stability of the properties of the filled matrix, which means the following criteria:

physicochemical compatibility, notably immiscibility of the polymers under the working conditions of the PIM process;

chemical stability (i.e. absence of notable chemical interaction between the polymers and between the polymers and the actinide powders used). Notably, this criterion demands that the mixture of the constituent polymers of the matrix be stable at least down to the lowest decomposition temperature of the constituents of the matrix of organic compounds.

Given that actinides are moreover compounds that are reputed to promote the decomposition of the constituent carbon-based compounds of the filled matrix (cf. "The activity and mechanism of uranium oxide catalysts for the oxidative destruction of volatile organic compounds", S. H. Taylor, C. S. Heneghana, G. J. Hutchingsa et al., Catalysis Today, 59:249-259, 2000; A study of uranium oxide based catalysts for the oxidative destruction of short chain alkanes, Applied Catalysis B: environmental, 25:137-149, 2000, S. H. Taylor et al.), this stability criterion of the properties is not trivial to achieve with, notably, either a risk of modification of the degree of oxidation of the actinides in contact with the constituent compounds of the matrix, or a risk of formation of non-debindable carbon-based residues (which may thus be disadvantageous at the end of the manufacture depending on the residual content) during the implementation of the PIM process;

a debindable filled matrix without the need to use an aqueous solution and not containing any water. Specifically, the use of actinide powders induces an increased risk of criticality during the use of water and this use moreover induces a generation of liquid effluents that are always difficult to process in a nuclear environment.

These acceptability criteria for the filled matrix are to be respected concomitantly given, moreover, the targeted actinide fuels/components must have characteristics at least equivalent to those that may be achieved by powder metallurgy, i.e., notably:

a density equivalent to at least 95% of the theoretical density of the target actinide compound after sintering of the components;

homogeneity of the microstructure, i.e. a uniform distribution of grain size and porosity;

control of the size, i.e. a variation of the dimensions of the fuel relative to the expected mean dimensions, i.e., for example and conventionally, a tolerance of ±12 microns for rectified REP pellets (8.19±0.012 mm);

a residual carbon mass content of less than 0.05% (for the cases of powders other than carbides).

SUMMARY OF THE INVENTION

All the criteria weighing directly on the filled matrix and those expected on the object that may be achieved by PIM of this same filler define a specific nontrivial problem that the present invention proposes to solve.

This is why one subject of the present invention is a set of filled compositions, which, despite the very specific and penalizing characteristics of the abovementioned actinide powders, allows a satisfactory implementation (in the sense of the abovementioned particular problem) of these powders in the PIM process.

One subject of the present invention is thus compositions filled with actinide which allow use in a standard process of injection molding type in order to obtain, after injection, debinding and sintering, components of complex, controlled geometries containing actinide compounds, having a microstructural quality equivalent to that which would have been obtained by standard powder metallurgy. Such formulations moreover allow the use of actinide powders currently used for the industrial manufacture of nuclear fuels, without particular preparation of the latter.

More specifically, one subject of the present invention is a composition filled with actinide powder comprising an organic matrix and an actinide powder or a mixture of actinide powders, characterized in that it comprises at least:

a plasticizer comprising an alkane whose longest radical chain comprises at least a few tens of carbon atoms and which is in a volume content of between 20% and 70% of the total volume of the organic compounds alone;

a binder comprising at least one polyolefinic polymer which is in a volume content of between about 20% and 50% of the total volume of the organic compounds alone;

a dispersant comprising a carboxylic acid or salts thereof, the volume content of which is less than 10% of the total volume of the organic compounds alone;

said actinide powder or said mixture of actinide powders representing between 40% and 65% of the volume of the filled matrix.

According to one variant of the invention, the polyolefinic polymer has a mean molar mass of at least 10 000 g/mol.

According to one variant of the invention, the polyolefinic polymer is polyethylene.

According to one variant of the invention, the polyolefinic polymer is polypropylene.

According to one variant of the invention, the polyolefinic polymer is polypropylene with a molar mass of greater than about 100 000 g/mol.

According to one variant of the invention, the plasticizer comprises paraffin. According to one variant of the invention, the plasticizer comprises polypropylene.

According to one variant of the invention, the plasticizer comprises polypropylene with a molar mass of about 10 000 g/mol.

According to one variant of the invention, the specific surface area of the grains of said actinide powder is between about 1 m$^2$/g and 15 m$^2$/g.

According to one variant of the invention, the tapped density of said actinide powder is between about 10% and 70% of the theoretical density of the powder compound(s).

According to one variant of the invention, the theoretical density of the constituent materials of the powder is between 2 and 20.

According to one variant of the invention, the theoretical density of the constituent materials of the powder is between 7 and 10.

According to one variant of the invention, the carboxylic acid or salts thereof have a molar mass at least equal to 100 g/mol.

According to one variant of the invention, the mass proportion of said carboxylic acid or salts thereof relative to the mass of actinide powders is between about 0.01% and 1% by mass.

BRIEF DESCRIPTION OF THE DRAWINGS

The invention will be understood more clearly and other advantages will emerge more clearly on reading the description that follows, which is given without any limitation, and by means of the attached figures, among which.

DETAILED DESCRIPTION

Figure 1:
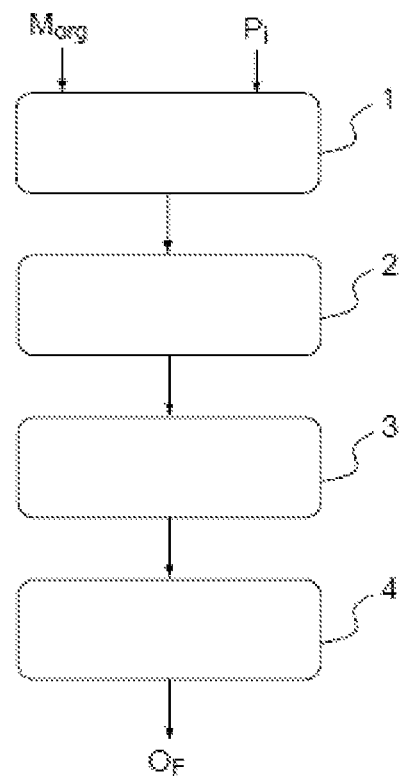
FIG. 1 illustrates all of the steps of a PIM process performed with the filled compositions of the present invention.

In general, the filled compositions of the present invention are intended to provide actinide fillers that have satisfactory properties and that allow implementation according to the PIM process described below and illustrated by the steps summarized in FIG. 1.

In a first step 1, corresponding to the mixing and blending of the starting materials, all of the starting materials are mixed together, namely, in the present invention: the organic matrix $M_{org}$ comprising the plasticizer, the binder, the dispersant, and the filler based on actinide powder $P_i$. As regards the procedure, the powder is generally added gradually to the mixture of the other heated starting materials using a blender, which may be equipped with paddles making it possible to obtain high shear rates, thus ensuring homogeneity of the whole.

In a second step 2, the step of injection molding may be performed as follows: the fluid filled matrix obtained previously is placed in an injection press. The injection cycle then proceeds in the following manner: the material placed in the injection press hopper arrives in the sheath which is heated to a suitable temperature and is then conveyed via an endless screw to the injection nozzle connected to the mold having the desired shape. Once the material has been metered out (volume linked to that of the component to be injected), the screw stops turning and the mold is filled under pressure (the screw acts as a piston). The mixture is then compacted in the print during the maintenance under pressure. The component is then ejected when the mixture has sufficiently cooled (sufficient rigidity). The main parameters that govern this step are: the temperature of the starting materials, the temperature of the mold, the injection pressure and the injection speed.

The third step 3 corresponds to the debinding operation. Debinding is a key operation of the process, which consists in removing the organic materials from the filled matrix, once the component has been injected. The quality of this operation is fundamental so as not to cause any physical damage (cracks) or chemical damage (carbidation) in the component. A very large proportion of the defects that appear after sintering is generated by inadequate debinding.

The fourth step 4 corresponds to the sintering operation. Once the debinding step has been completed, the component must be consolidated by a sintering step. Sintering is a thermal process which makes it possible, by heating compacted powders, generally below their melting point, to give them cohesion after cooling and to obtain the desired microstructure of the final material. The principle of sintering is based on atomic scattering: particles in contact weld via atomic transport phenomena via scattering if they are subjected to temperatures higher than half of their absolute melting point so as to obtain a finished object $O_F$.

Examples of Filled Compositions Used in the Present Invention:

In order to demonstrate the possibility of using the compositions of the present invention in a satisfactory manner, in the sense of the abovementioned problem, several filled compositions comprising a plasticizer, a binder and a dispersant as described in the present invention with an actinide powder reputed to be cohesive were prepared, with industrial uranium oxide powders.

Since one of the main difficulties induced by the use of actinide powders in the PIM process is linked to the cohesive nature of this type of powder, the example of powder used for the illustration of the present invention is representative of this characteristic. To do this, uranium oxide powder was used, the crystallites of which (constituent elemental objects of the powder) are grouped into aggregates, which are themselves lumped into agglomerates.

The main characteristics of the powder mainly used for the illustration of the present invention are given below:

a formed agglomerate diameter: $D_{agglomerate}$ of between 10 and 200 μm;

a formed aggregate diameter: $D_{aggregate}$ equal to 1 μm;

a formed crystallite diameter: $D_{crystallite}$ equal to 0.3 μm;

a specific surface area: Ssa=2 $m^2/g$.

Figure 2:
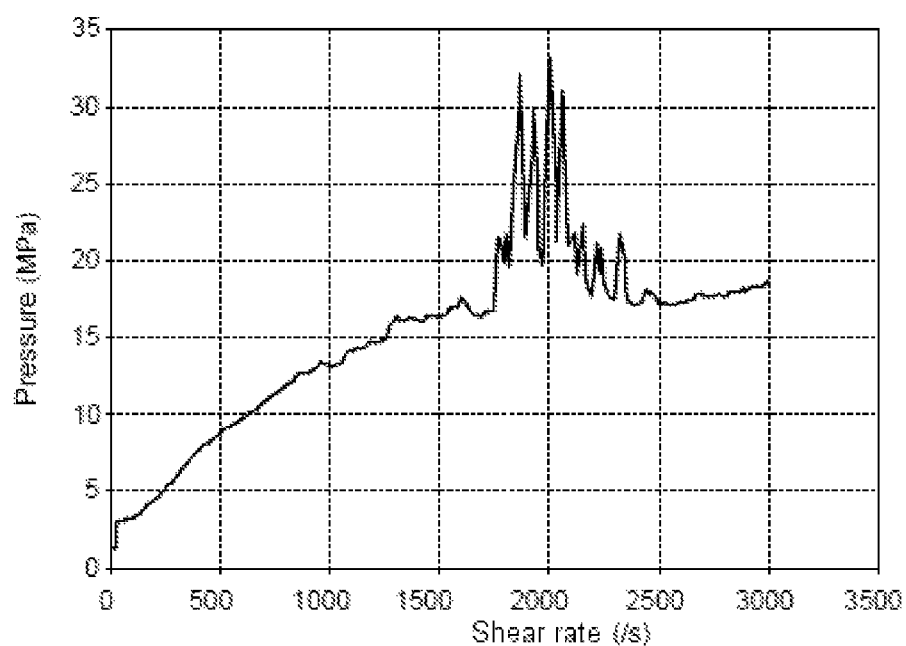
FIG. 2 illustrates an example of rate of instability of the flow pressure as a function of the shear rate for a typical case of poor formulation or blending condition.

FIG. 2 illustrates the rate of the flow pressure as a function of the shear rate (unit: $s^{-1}$) for a typical case of poor formulation or blending condition, which may typically be obtained from an organic matrix comprising a standard polymer.

Various filled composite compositions according to the invention collated in Table 1 below were studied:

| Reference of the formulation examples | Constituents | Volume percentages between organic compounds | Volume filler content of $UO_{2+x}$ |
|---|---|---|---|
| Fa | Low-density polyethylene/paraffin/ stearic acid/$UO_{2+x}$ | 20/27.5/2.5 | 50% |
| Fb | Polypropylene/paraffin wax/ stearic acid/$UO_{2+x}$ | 20/27.5/2.5 | 50% |
| Fc | Low-density polyethylene/polypropylene/ stearic acid/$UO_{2+x}$ | 20/27.5/2.5 | 50% |

| Process step | Operating conditions |
| --- | --- |
| Blending (performed in a paddle blender) | T° = 175° C.<br>Time = 60 minutes<br>Paddle spin speed = 30 rpm |
| Forming by injection | Injection pressure: 1500 bar<br>Maintenance pressure: 1200 bar<br>Temperature: 225° C.<br>Cooling time: 30 s<br>Mold closing force: 80 kN<br>Injection speed: 20 cm³/s |
| Debinding (thermal) | Thermal cycle: various temperature rises ranging from room temperature to 570° C. with different stages, under Ar/5% H₂ atmosphere |
| Sintering | Thermal cycle: temperature rise at 300° C./h, then steady stage for 4 hours at 1700° C. and temperature decrease ramp at 600° C./h |

Table 2 above gives examples of operating conditions under which the compositions of the present invention were prepared.

The present description gives below the elements for illustrating the achievement of the numerous acceptability criteria for the filled compositions described, notably with regard to the problem of the present invention.

Figure 3:
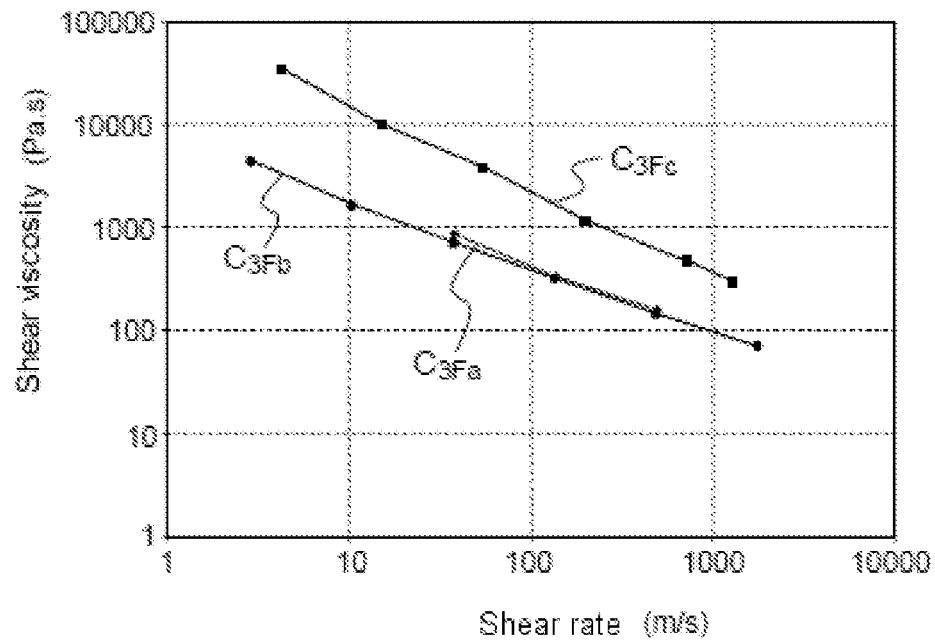
FIG. 3 illustrates the shear viscosity as a function of the shear rate at 220° C. for various filled compositions according to the invention: Fa, Fb and Fc.

Injectability and Filler Content in Filled Compositions According to the Invention:

FIG. 3 gives an illustration of the injectability of the compositions Fa, Fb and Fc and is representative of the shear viscosity as a function of the shear rate (unit: s$^{-1}$) at 220° C., with a blending temperature of 175° C. and a filler content of 50% by volume. The curves $C_{3Fa}$, $C_{3Fb}$ and $C_{3Fc}$ are, respectively, relative to the compositions Fa, Fb and Fc.

In the light of the shear viscosity values for these formulations, it is possible to indicate that these filled compositions are indeed acceptable with respect to the rheology criterion, despite a relatively large filler content, since it is between 50 and 10 000 Pa·s.

Figure 4:
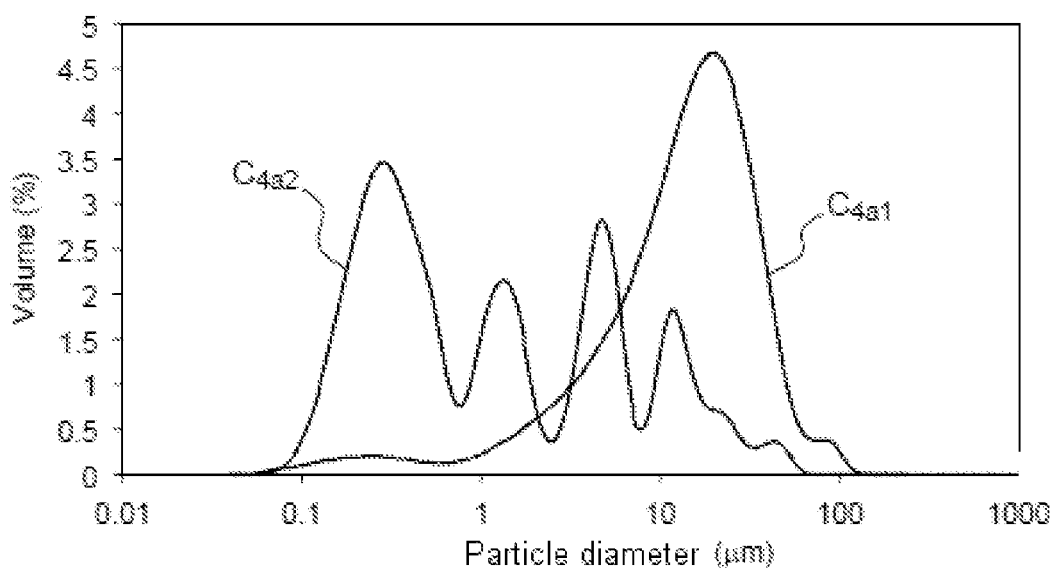
FIG. 4 illustrates an example of the volume distribution of the diameter of the particles (cohesive ceramic type) before and after blending with a formulation of Fa type.

It should be noted that these formulations also make it possible to deagglomerate cohesive powders, as shown by FIG. 4, which shows an example of volume distribution of the diameter of the particles (cohesive ceramic type) before blending (curve $C_{4a1}$) and after blending (curve $C_{4a2}$) making it possible to obtain smaller particle diameters.

Figure 5A:
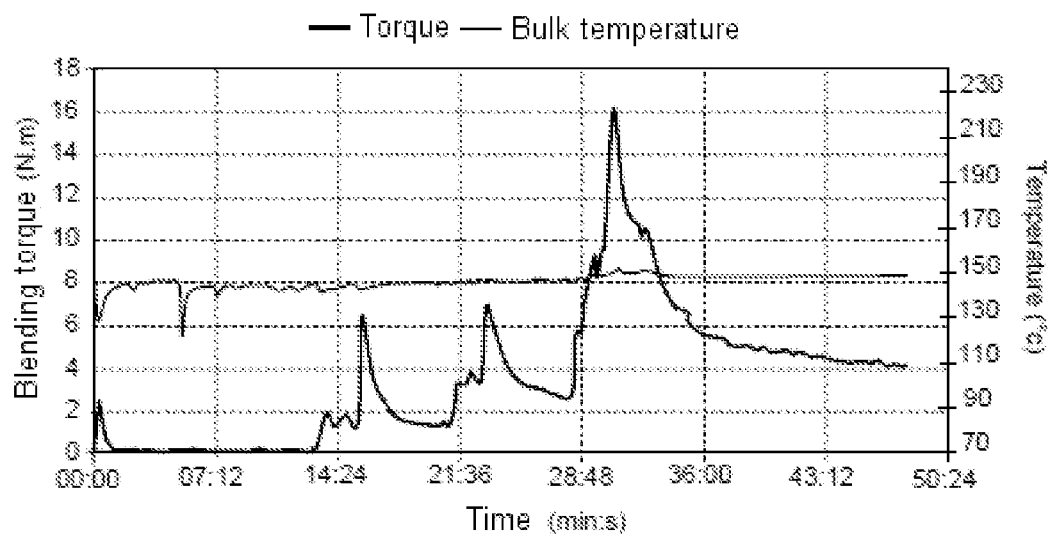
FIGS. 5a, 5b and 5c show the change in the blending torque as a function of time for the various compositions Fa, Fb and Fc, FIGS. 5d and 5e illustrating the change in the blending torque as a function of the filler content.
Figure 5B:
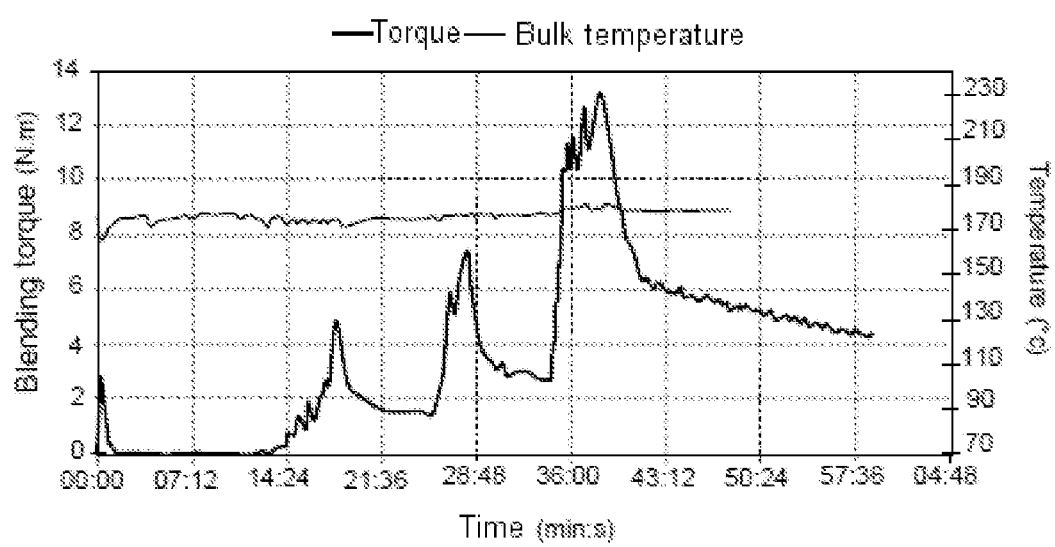
Figure 5C:
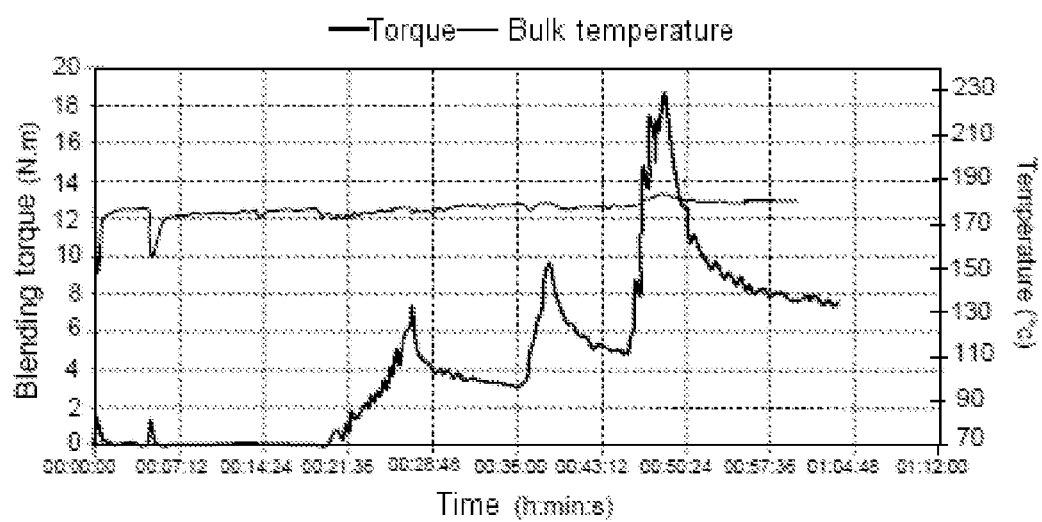

FIGS. 5a, 5b and 5c illustrate the blending torques and the temperatures applied over time for the three compositions Fa, Fb and Fc.

Figure 5D:
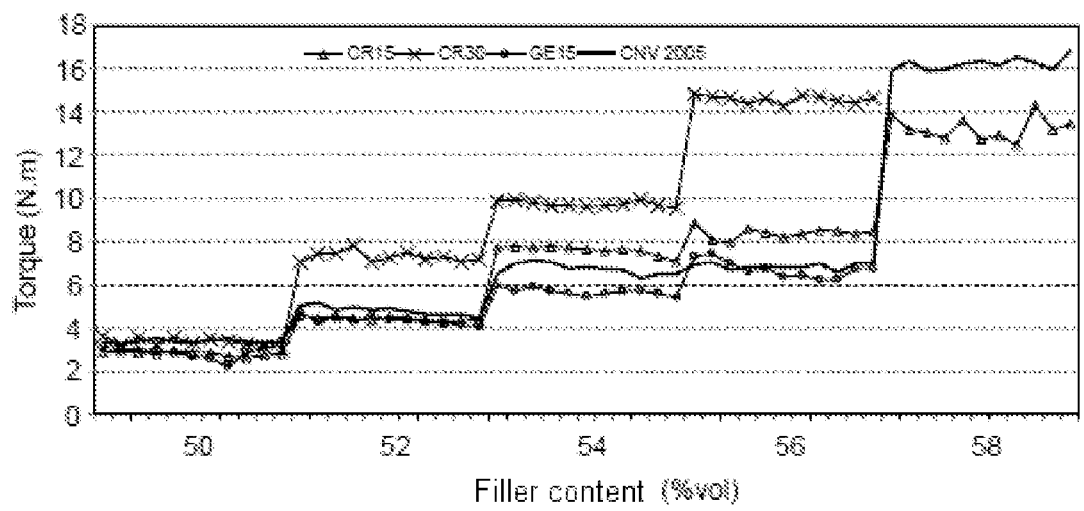

FIG. 5d shows the change in the blending torque as a function of the filler content (volume percentage), for the filled composition Fb, and for the same starting materials mixed with several types of powders. The reference CNV corresponds to the $UO_{2+x}$ powder obtained via the dry route. The three other references are alumina powders that are capable of limiting the effects of radiolysis on the rheology of the filled pulps and the mechanical strength of the injected objects before debinding. The reference Cr is the manufacturing name which indicates ground, and the reference GE indicates non-ground. The figure that follows indicates the specific surface area of the powder.

CR15: ground alumina powder with a specific surface area of 15 m²/g;

CR30: ground alumina powder with a specific surface area of 30 m²/g;

GE15: non-ground alumina powder with a specific surface area of 15 m²/g.

Figure 5E:
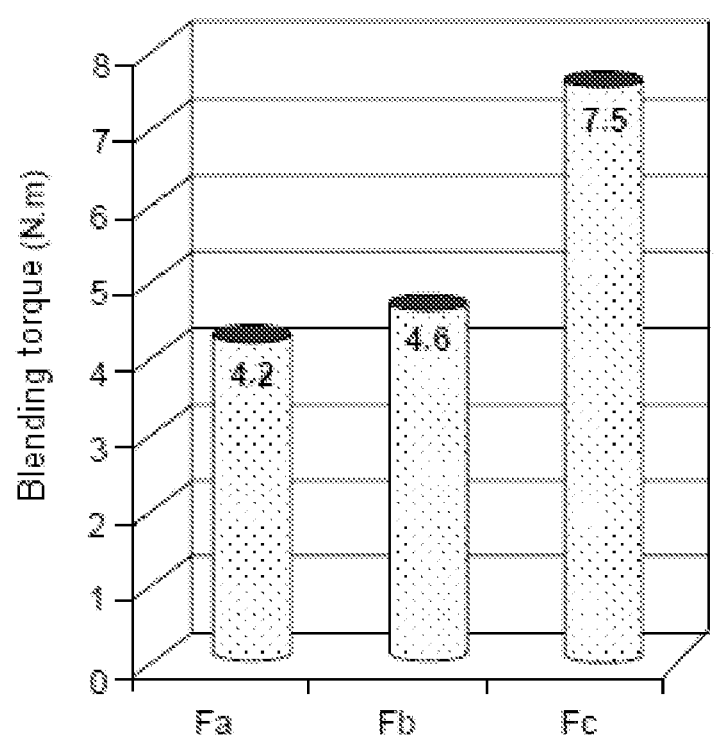

FIG. 5e illustrates the blending torque values for the formulations Fa, Fb and Fc for a degree of incorporation of $UO_2$ powder of 50% by volume, a temperature $T_{blending}=145°$ C. for the filled compositions Fa and Fc and a temperature $T_{blending}=175°$ C. for the filled composition Fb.

Figure 6A:
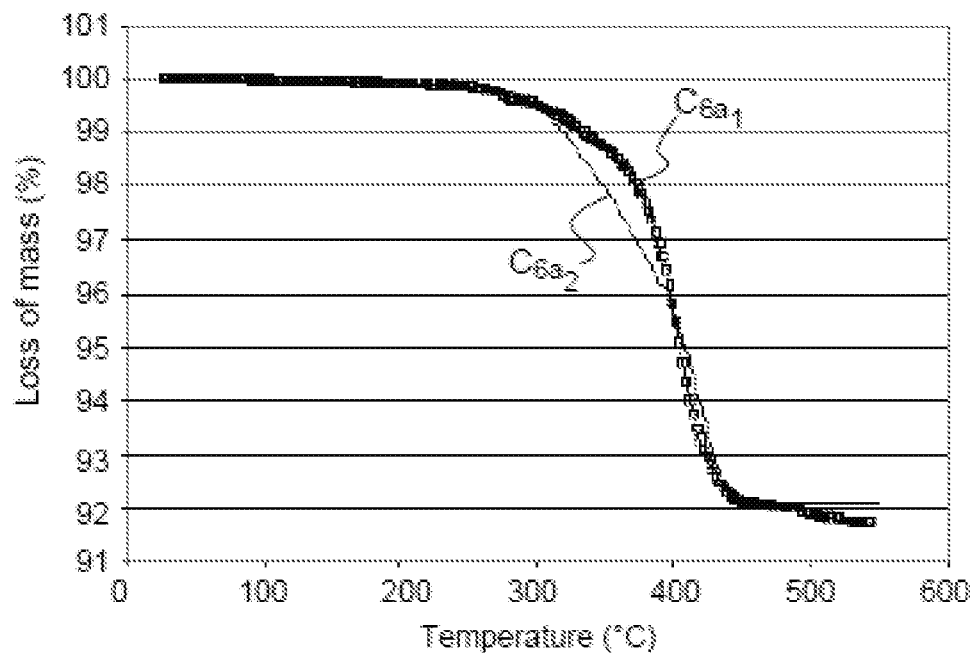
FIGS. 6a, 6b and 6c illustrate the experimental change in loss of mass of the examples of compositions Fa, Fb and Fc according to the invention, during the debinding operation, and are compared with the theoretical curves (behavior of the independent formed polymers)
Figure 6B:
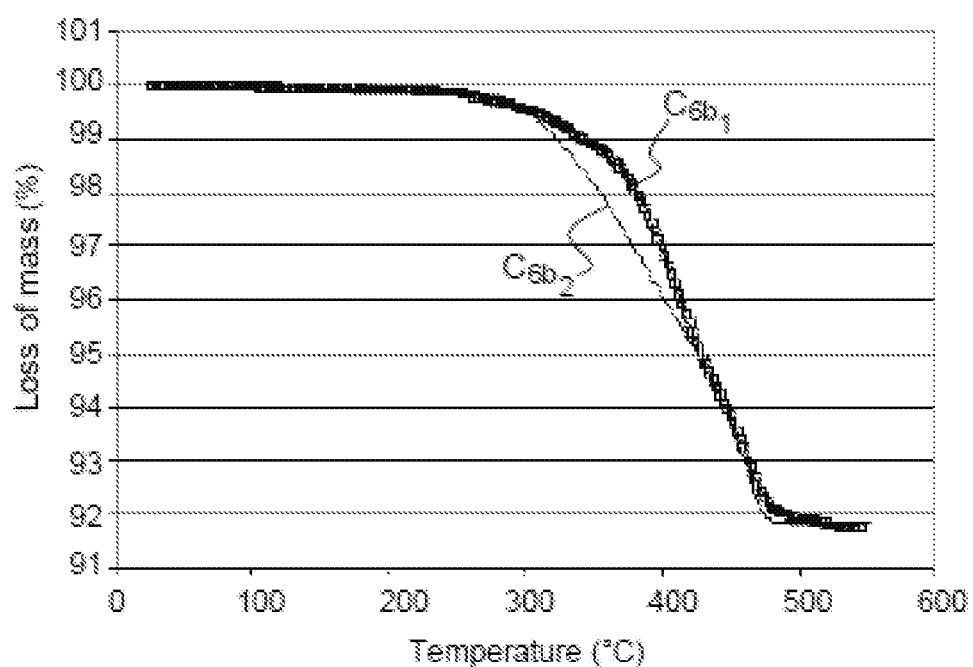
Figure 6C:
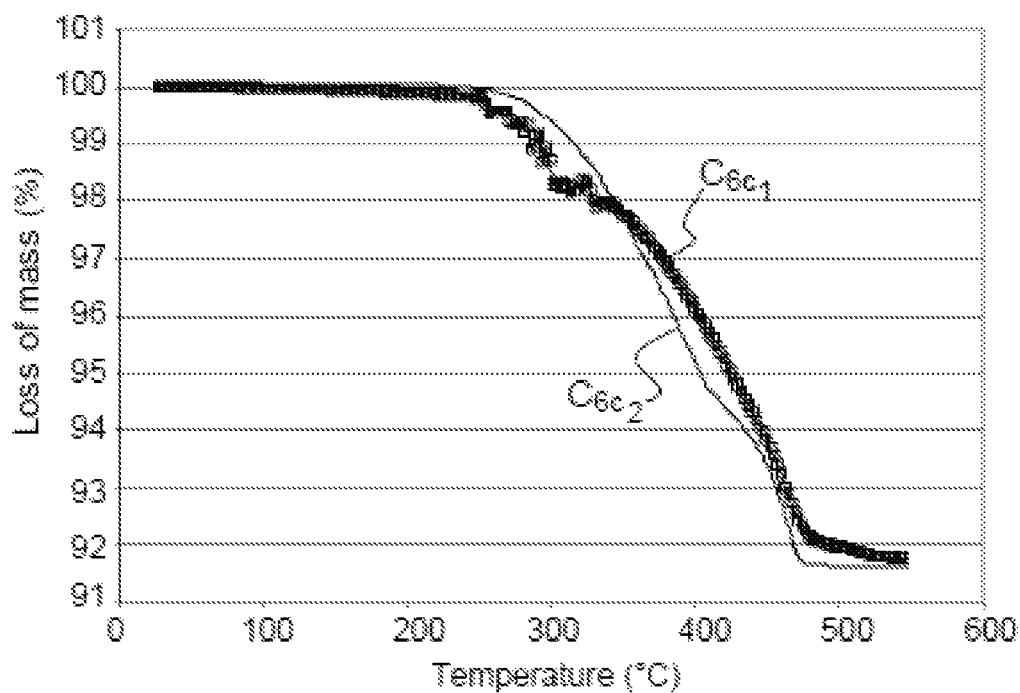

Stability of the Properties of the Filled Compositions According to the Invention:

The preceding three filled compositions were moreover evaluated during a debinding operation and these results were compared with theoretical results. FIGS. 6a, 6b and 6c are, respectively, relative to the filled compositions Fa, Fb and Fc and illustrate the virtual absence of interaction of the organic constituents of the matrix, the overall debinding behavior of which may be likened to a linear combination of the individual behaviors of the latter. More specifically, the curves $C_{6a1}$, $C_{6b1}$ and $C_{6c1}$ relate to the theoretical curves, and curves $C_{6a2}$, $C_{6b2}$ and $C_{6c2}$ relate to the experimental curves.

This target stability is also confirmed by the comparison of the melting points of the various constituents when they are taken individually or as a mixture as represented in Table 3 below.

TABLE 3

Figure 7:
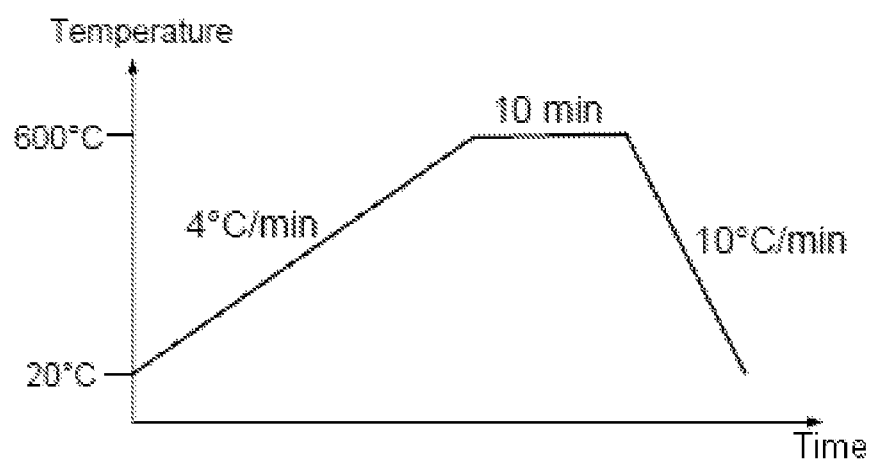
FIG. 7 illustrates an example of a thermal cycle in a debinding operation under $Ar/H_2$ atmosphere to which are subjected compositions of the invention.

|  | LDPE | PP2 | PW | PP1 |
| --- | --- | --- | --- | --- |
| Polymers alone | 112.4 | 165.4 | 74.5 | 155.8 |
| Fa | 97.8 |  | 58.9 |  |
| Fb |  | 147.1 | 60.1 |  |
| Fc | 108 |  |  | 155.6 | with LDPE: low-density polyethylene
PP2: polypropylene, molar mass of 200 000 g/mol
PW: paraffin wax
PP1: polypropylene, molar mass of 12 000 g/mol An example of a thermal cycle that may be used under an atmosphere of argon and hydrogen in the debinding process is illustrated in FIG. 7, and is applied to the three filled compositions: Fa, Fb and Fc, this short thermal cycle being performed to allow rapid evaluations of the compositions obtained. In general, long debinding cycles (typically a few hours) will be preferred during industrial treatments for the manufacture of formed powders to make it possible to conserve the integrity of the component.

Figure 8A:
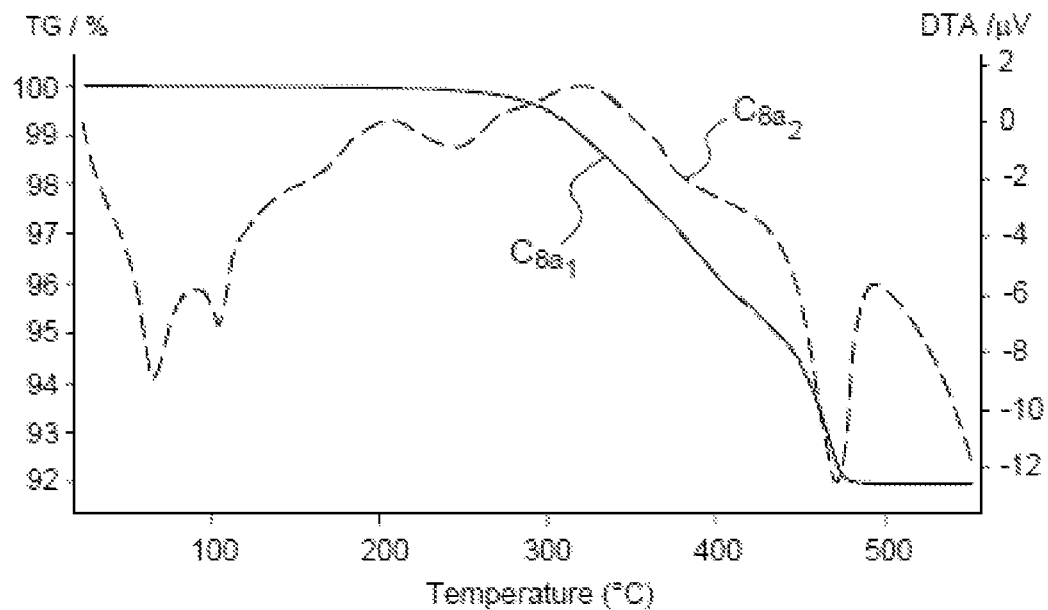
FIGS. 8a, 8b and 8c illustrate responses of thermogravimetric analysis (TGA) and differential thermal analysis (DTA) measurements performed on compositions of the present invention.
Figure 8B:
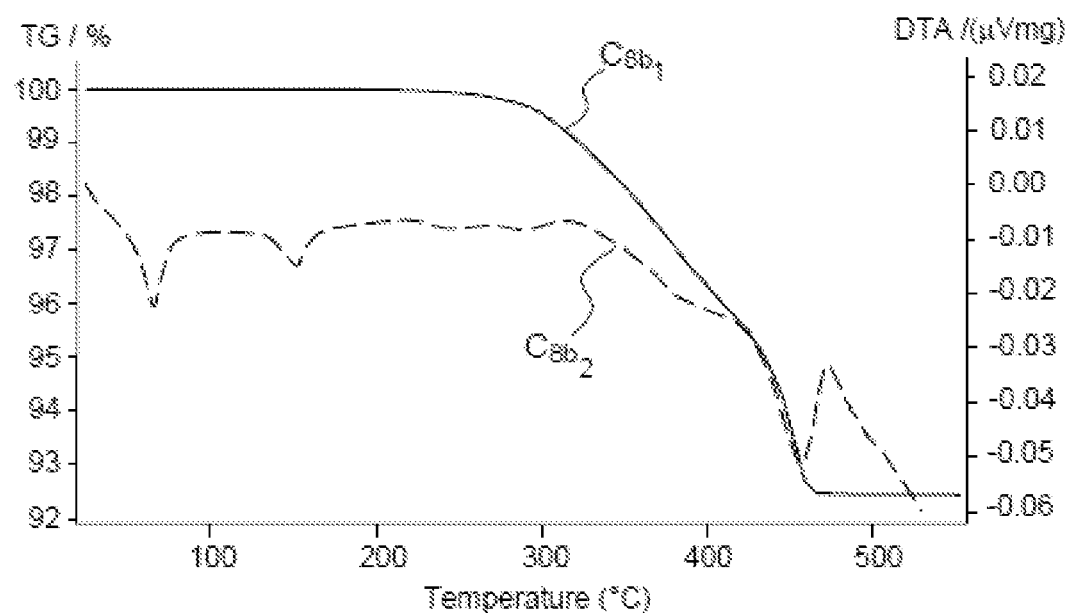
Figure 8C:
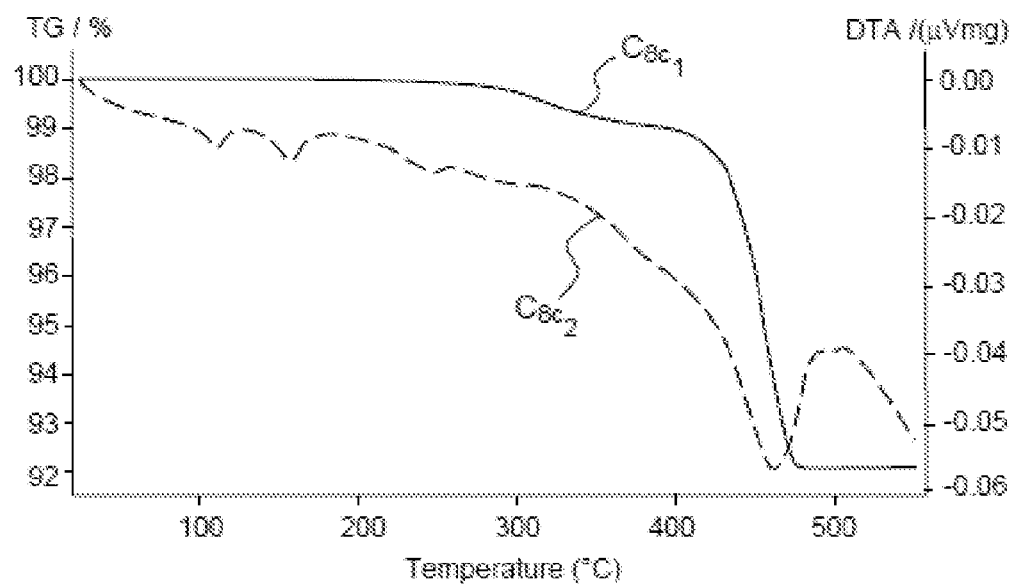

FIGS. 8a, 8b and 8c illustrate the debinding operations as regards the thermal behavior of the filled compositions Fa, Fb and Fc. More specifically, curves $C_{8a1}$, $C_{8b1}$ and $C_{8c1}$ relate to TGA measurement results and curves $C_{8a2}$, $C_{8b2}$ and $C_{8c2}$ relate to DTA measurement results. These are thermogravimetric analysis (TGA) and differential thermal analysis (DTA) measurements.

Differential thermal analysis (DTA) is a method used for determining the temperatures corresponding to changes in the material as a function of the thermal treatment. It consists in measuring the temperature difference between a sample (Te) and a reference (Tr) (thermally inert material) as a function of time or temperature, when they are subjected to a programmed temperature variation, under a controlled atmosphere.

In general, the phase transitions and the evaporation of solvents are reflected by endothermic peaks. On the other hand, crystallization, oxidation and certain decomposition reactions are characterized by exothermic peaks. DTA is generally associated with a thermogravimetric analysis (TGA) which makes it possible to measure the variation of a mass of a sample as a function of the thermal treatment temperature. This mass variation may be a loss of mass such as the emission of vapors or a gain of mass during the fixing of a gas, for example.

The curves of these figures do not show any exothermicity peaks or any notable event other than phenomena of melting and of degradation/volatilization of the filled matrix constituents, which confirms the stability of these formulations.

Figure 9A:
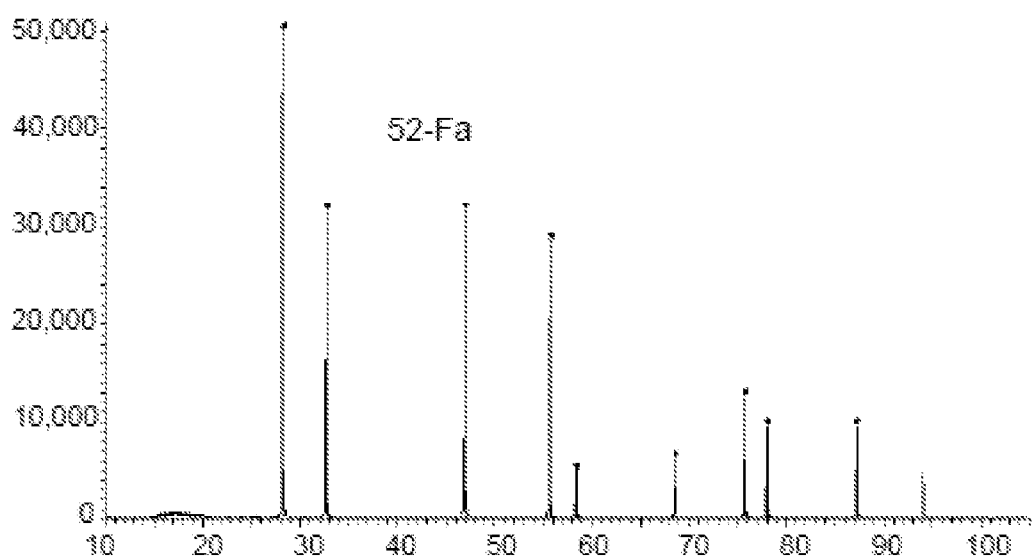
FIGS. 9a, 9b and 9c illustrate XRD spectra of compositions of the present invention.
Figure 9B:
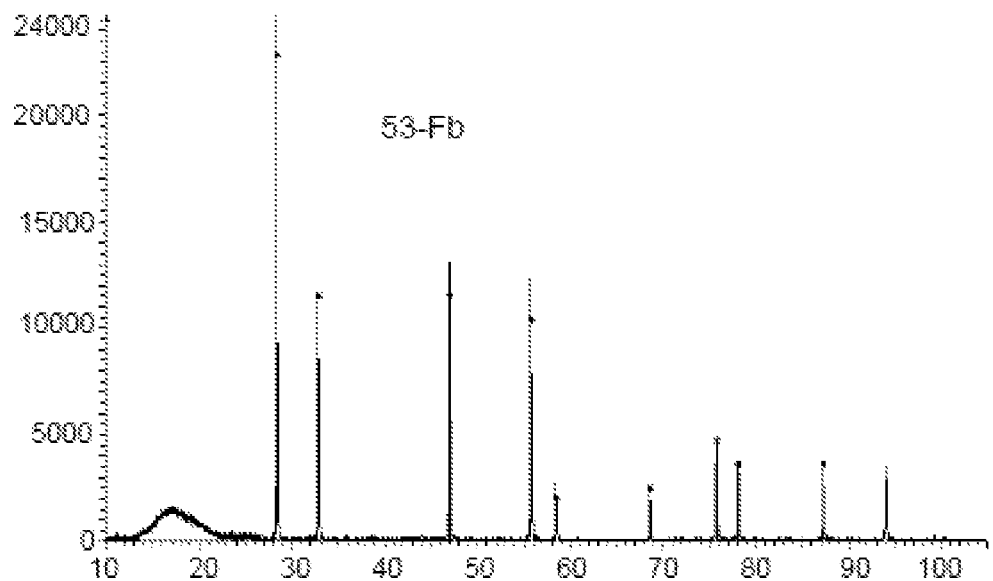
Figure 9C:
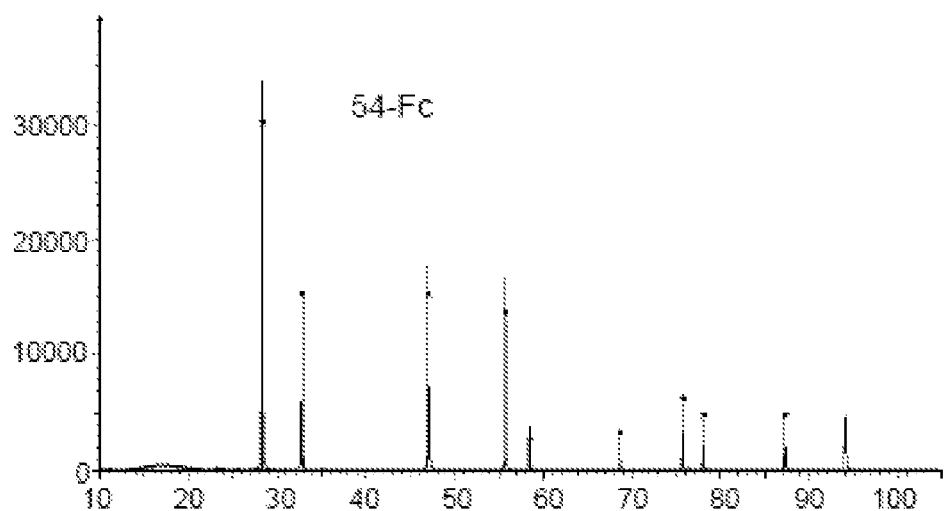

These measurements are reinforced in their conclusion by the XRD measurements, which were taken at the end of the process for producing the powders and thus after the sintering operation. FIGS. 9a, 9b and 9c illustrate, to this end, the XRD spectra of the filled compositions Fa, Fb and Fc and do not reveal any change in the $UO_2$ phase of the fuel, which argues in favor of no significant interaction of the actinide powder with the forming polymers, which is targeted with the present filled compositions Fa, Fb and Fc.

Debinding Capacity of the Filled Compositions According to the Invention:

As regards the debinding capacity criterion, it is necessary for the debinding operation to be able to be performed while conserving the integrity of the component once the forming polymers have been debonded and without an excessive proportion of carbon-based residues that would not be removable during sintering and that might moreover modify the microstructure of the sintered actinide material.

To demonstrate the acceptability of the examples of filled compositions Fa, Fb and Fc with respect to this criterion, Table 4 below gives the percentages of carbon-based residues in the components obtained from sintering with an illustration of the shape of the TGA signal for the Fa formulation sintered under oxidation:

TABLE 4

| Formulation | Residual carbon content after sintering |
|---|---|
| Fa | 0.0155% wt |
| Fb | 0.0141% wt |
| Fc | 0.0111% wt |

Figure 10:
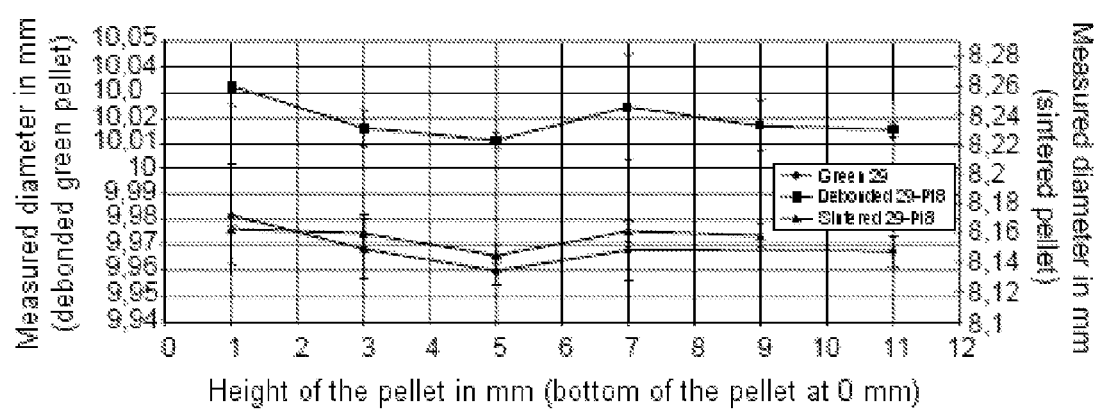
FIG. 10 illustrates the diameter variations measured as a function of the heights of pellets obtained before the debinding operation and after the sintering operation.

After sintering, the components moreover have controlled geometry and microstructure as illustrated in FIG. 10 relating to the measured variations in diameter as a function of the heights of pellets obtained before the debinding operation and after the sintering operation.

The invention claimed is:

1. A composition filled with actinide powder comprising an organic matrix and an actinide powder or a mixture of actinide powders, comprising:
    a plasticizer comprising an alkane whose longest radical chain comprises at least a few tens of carbon atoms and is in a volume content of between 20% and 70% of the total volume of the organic compounds alone;
    a binder comprising at least one polyolefinic polymer and which is in a volume content of between 20% and 50% of the total volume of the organic compounds alone; and
    a dispersant comprising a carboxylic acid or salts thereof, the volume content of which is less than 10% of the total volume of the organic compounds alone;
    wherein said actinide powder or said mixture of actinide powders represent between 40% and 65% of the volume of the filled matrix.

2. The composition filled with actinide powder as claimed in claim 1, wherein the polyolefinic polymer has a mean molar mass of at least 10 000 g/mol.

3. The composition filled with actinide powder as claimed in claim 1, wherein the polyolefinic polymer is polyethylene.

4. The composition filled with actinide powder as claimed in claim 1, wherein the polyolefinic polymer is polypropylene.

5. The composition filled with actinide powder as claimed in claim 1, wherein the plasticizer comprises paraffin.

6. The composition filled with actinide powder as claimed in claim 1, wherein the plasticizer comprises polypropylene.

7. The composition filled with actinide powder as claimed in claim 1, wherein the actinide powder is a uranium oxide powder.

8. The composition filled with actinide powder as claimed in claim 1, wherein the specific surface area of the grains of said actinide powder is between about 1 $m^2/g$ and 15 $m^2/g$.

9. The composition filled with actinide powder as claimed in claim 1, wherein the tapped density of said actinide powder is between about 10% and 70% of the theoretical density of the compound(s) of the powder(s).

10. The composition filled with actinide powder as claimed in claim 1, wherein the theoretical density of the constituent materials of the powder is between 2 and 20.

11. The composition filled with actinide powder as claimed in claim 10, wherein the theoretical density of the constituent materials of the powder is between 7 and 10.

12. The composition filled with actinide powder as claimed in claim 11, wherein the carboxylic acid or salts thereof have a molar mass at least equal to 100 g/mol.

13. The composition filled with actinide powder as claimed in claim 1, wherein the mass proportion of said carboxylic acid or salts thereof relative to the mass of actinide powders is between about 0.01% and 1% by mass.

* * * * *